C. A. TYRRELL.
SYRINGE.
APPLICATION FILED MAR. 7, 1911.
1,086,873.
Patented Feb. 10, 1914.
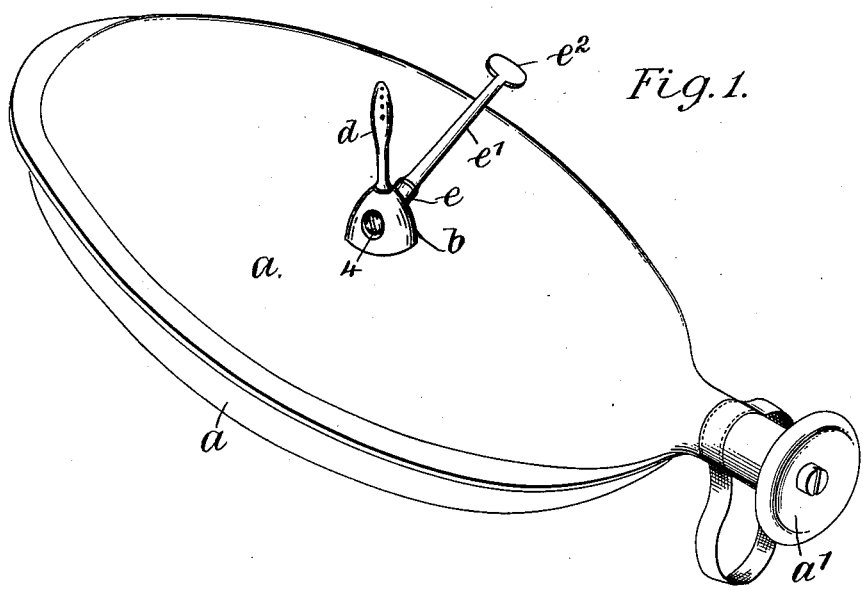
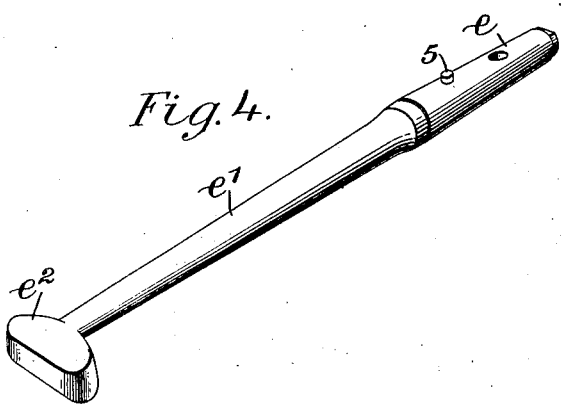
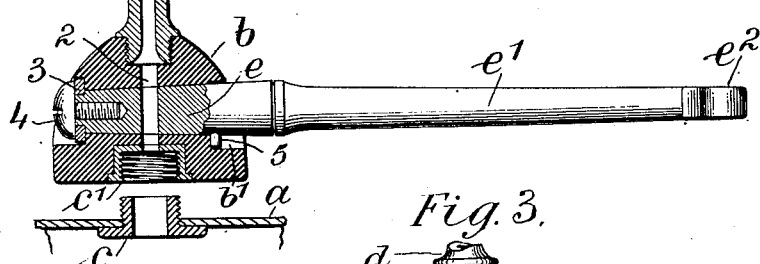
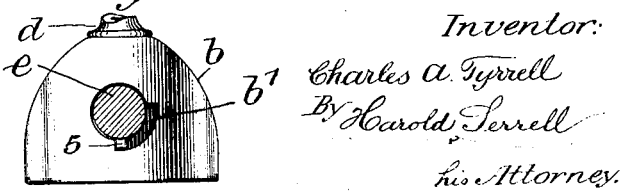
Witnesses:
Chas. H. Smith
Bertha M. Allen
Inventor:
Charles A. Tyrrell
By Harold Serrell
his Attorney

UNITED STATES PATENT OFFICE.

CHARLES A. TYRRELL, OF NEW YORK, N. Y.

SYRINGE.

1,086,873.  Specification of Letters Patent.  Patented Feb. 10, 1914.

Application filed March 7, 1911. Serial No. 612,899.

*To all whom it may concern:*

Be it known that I, CHARLES ALFRED TYRRELL, a subject of the King of Great Britain, residing at the borough of Manhattan, in the city, county, and State of New York, have invented a new and useful Improvement in Syringes, of which the following is a specification.

My invention is designed as an improvement upon the device shown and described in U. S. Letters Patent No. 757654, granted April 19, 1904, to H. M. Guild, and now owned by me, with the object of simplifying the construction, lessening the cost of manufacture, and increasing the operative efficiency of the device. In the device of my invention, the valve stem is smooth and tapering and is held in place at one end in the conoidal head by a screw and washer and there is no enforced longitudinal movement thereof, as in the device of said patent. The pin limiting the turning movement of the valve stem is in the stem concealed in the conoidal head and it moves through a quadrant or quarter circle recess of said head, so that the strength of the stem is not weakened by being cut into as in the device of said patent, and the head is not weakened by a screw pin. The device of my invention, the same as the device of said patent, is mounted directly upon a water reservoir and an injection stem is removably connected to and rises upright from said head to enter the rectum for flushing or irrigating the same and the colon or large intestine,—all of which is hereinafter more fully described.

In the drawing, Figure 1 is a perspective view showing the embodiment of my invention. Fig. 2 is a vertical section and elevation without the liquid reservoir. Fig. 3 is an elevation and partial section at right angles to Fig. 2, and Fig. 4 is a perspective view of the handle and valve stem alone.

$a$ represents a reservoir for liquid, preferably a rubber bag of well known character, and $a'$ the filling nozzle also of any usual form.

The head $b$ is preferably of hard rubber or similar suitable material and of conoidal shape and axially perforated at 2. I employ a screw washer $c$ projecting through an opening from within the rubber bag $a$ and in the base of the head $b$, a screw-cap $c'$ is secured in a recess to screw upon the washer $c$ in mounting the head $b$ upon the rubber bag. The upper part of the head $b$ is recessed and interiorly threaded to receive the injector stem $d$, there is therefore an axial opening or passage through the head $b$, the washer $c$, cap $c'$, and injector stem $d$. The head $b$ is bored through at right angles to the central perforation 2 with a tapering hole to receive the tapering valve stem $e$ and the head is recessed for the washer 3 and screw 4, by which the stem is secured in the head and may be turned by the handle $e'$ and knob end $e^2$ made integral with the stem $e$.

The valve stem $e$ is provided with a stop pin 5 and adjacent thereto, the head is formed partially around the stem, with a quadrant or quarter circle recess $b'$, both ends of which act as stops for the pin 5 and valve stem $e$ whereby in one position the transversely placed hole through the valve stem is in line with the opening 2 of the head and in the other position turned to one side and closed off, these positions being manually effected by turning the knob end $e^2$, handle and valve stem. As the pin 5 is below the surface of the head, it cannot cause the user the inconvenience of contact.

In the use of the device of my invention, with the reservoir containing suitable liquid, and the injection stem $d$ inserted in the rectum for flushing the same, the said stem is held in its proper position by the natural restriction or contractile action of the sphincter muscle and personal weight upon the reservoir is the motive power which forces the liquid or fluid employed for flushing purposes into the rectum and colon without physical effort on the part of the user. The quantity of liquid injected is regulated by the user operating the knob, handle and valve stem, and the force employed is controlled by personal weight alone placed upon the liquid receptacle. The injector stem $d$ is interchangeable with other forms of tubular members fitting the conoidal head and employed for other equivalent uses.

I claim as my invention:

In a device of the character described and in combination, an axially perforated conoidal head provided with a recess for the reception of a stop pin, an injection tube secured thereto, means for connecting the head with a receptacle or source of liquid supply, a rotary tapering valve stem mounted in said head and extending across the perforation therein and having an opening which, in one position of the valve stem, registers with the opening in the head, means for holding the valve stem in the head, and a pin fixed in the said valve stem and operating in the recess in the said head so that in all positions the said pin is entirely below the surface of the said head and within the recess therein.

Signed by me this 28th day of February 1911.

CHAS. A. TYRRELL.

Witnesses:
 GEO. T. PINCKNEY,
 BERTHA M. ALLEN.